United States Patent
Riggs

(10) Patent No.: US 9,455,482 B2
(45) Date of Patent: Sep. 27, 2016

(54) SELF-RECHARGING BATTERY APPARATUS AND METHOD OF OPERATION

(71) Applicant: Argopower, LLC, Cocoa, FL (US)

(72) Inventor: Allan Riggs, Cocoa, FL (US)

(73) Assignee: Argopower, LLC, Cocoa, FL (US)

( * ) Notice: Subject to any disclaimer, the term of this patent is extended or adjusted under 35 U.S.C. 154(b) by 186 days.

(21) Appl. No.: 14/364,061

(22) PCT Filed: Dec. 8, 2012

(86) PCT No.: PCT/US2012/068643
§ 371 (c)(1),
(2) Date: Jun. 9, 2014

(87) PCT Pub. No.: WO2013/086470
PCT Pub. Date: Jun. 13, 2013

(65) Prior Publication Data
US 2014/0335380 A1    Nov. 13, 2014

Related U.S. Application Data

(60) Provisional application No. 61/568,562, filed on Dec. 8, 2011, provisional application No. 61/588,366, filed on Jan. 19, 2012.

(51) Int. Cl.
| | |
|---|---|
| *H01M 16/00* | (2006.01) |
| *H01M 6/32* | (2006.01) |
| *H01M 6/50* | (2006.01) |
| *H01M 12/06* | (2006.01) |
| *H01M 4/46* | (2006.01) |
| *H01M 2/10* | (2006.01) |
| *H01M 2/36* | (2006.01) |
| *H01M 10/46* | (2006.01) |
| *H01M 6/34* | (2006.01) |

(52) U.S. Cl.
CPC .......... *H01M 16/006* (2013.01); *H01M 4/466* (2013.01); *H01M 6/32* (2013.01); *H01M 6/5033* (2013.01); *H01M 12/06* (2013.01); *H01M 16/00* (2013.01); *H01M 2/105* (2013.01); *H01M 2/1094* (2013.01); *H01M 2/36* (2013.01); *H01M 6/34* (2013.01); *H01M 10/46* (2013.01); *H01M 2250/402* (2013.01); *Y02B 90/12* (2013.01)

(58) Field of Classification Search
None
See application file for complete search history.

(56) References Cited

U.S. PATENT DOCUMENTS

| | | | |
|---|---|---|---|
| 3,607,403 A * | 9/1971 | Arrance | H01M 16/00 429/406 |
| 4,794,059 A | 12/1988 | Hope | |

(Continued)

FOREIGN PATENT DOCUMENTS

| | | |
|---|---|---|
| WO | 98/45503 | 10/1998 |

OTHER PUBLICATIONS

International Search Report and Written Opinion for PCT/US 12/68643 dated Mar. 8, 2013.

*Primary Examiner* — Patrick Ryan
*Assistant Examiner* — Wyatt McConnell
(74) *Attorney, Agent, or Firm* — Miles & Stockbridge P.C.; David R. Schaffer

(57) ABSTRACT

A self-recharging battery apparatus including a magnesium-air fuel cell component having external battery connector elements; a rechargeable battery; and a water-tight inner sleeve configured to and receiving the rechargeable battery and the inner sleeve being fixedly connected to an inner side of the magnesium-air fuel cell component and the rechargeable battery being electrically connected to the magnesium-air fuel cell component external battery connector elements.

16 Claims, 13 Drawing Sheets

(56) References Cited

U.S. PATENT DOCUMENTS

| | | |
|---|---|---|
| 6,844,106 B2 | 1/2005 | Heller, Jr. |
| 2004/0115519 A1 | 6/2004 | Lee |
| 2005/0019651 A1 | 1/2005 | Tsai |
| 2007/0048595 A1 | 3/2007 | Graham |
| 2008/0246416 A1 | 10/2008 | Jones |

* cited by examiner

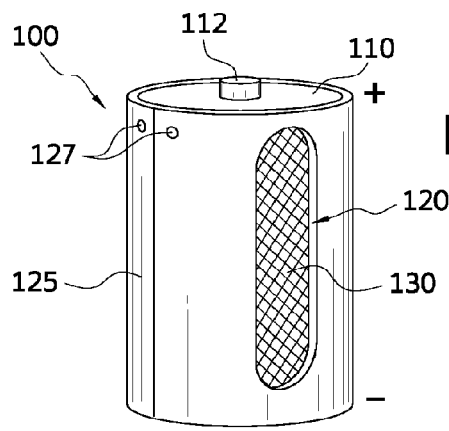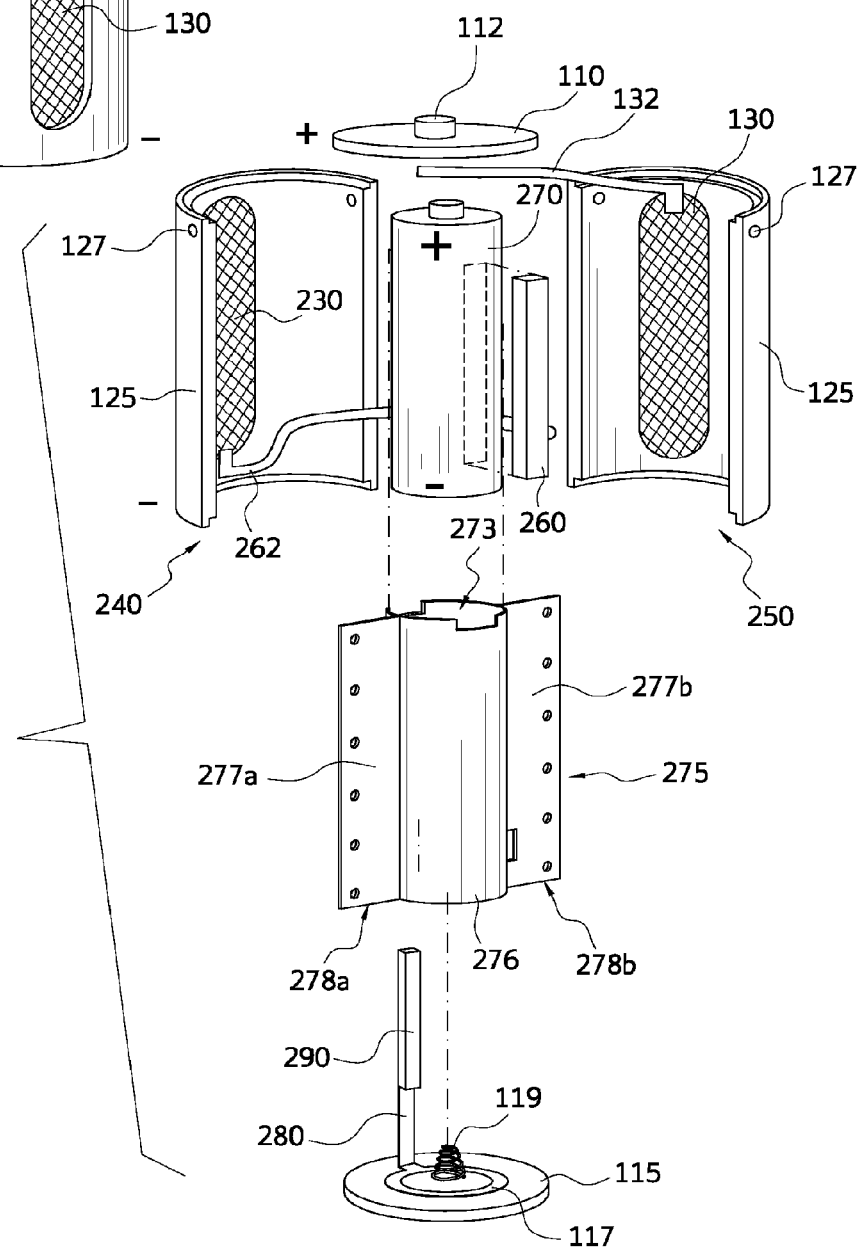

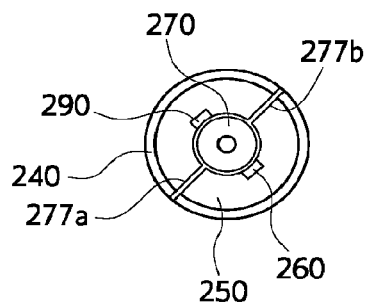
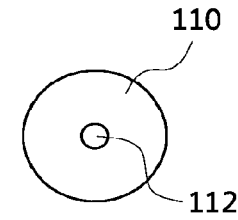
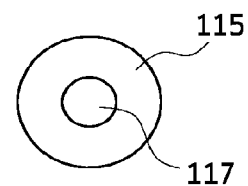
FIG. 3A  FIG. 3B  FIG. 4
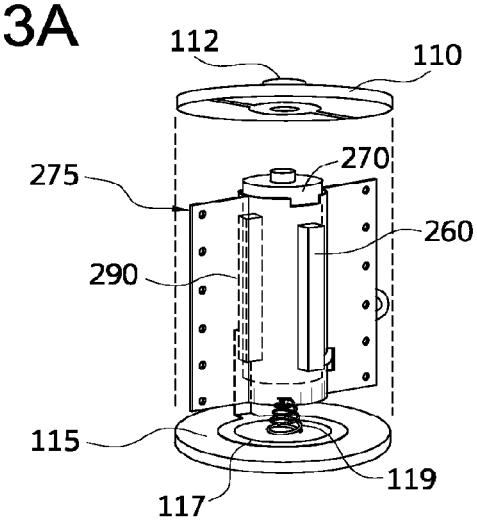
FIG. 5
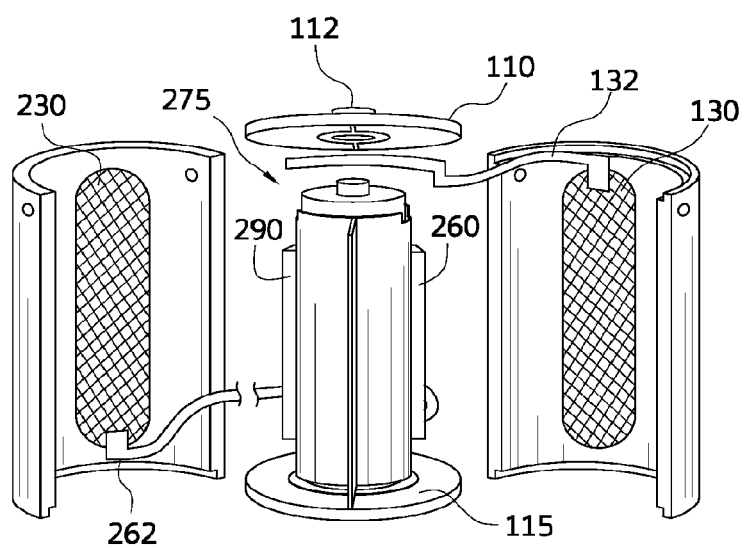
FIG. 6

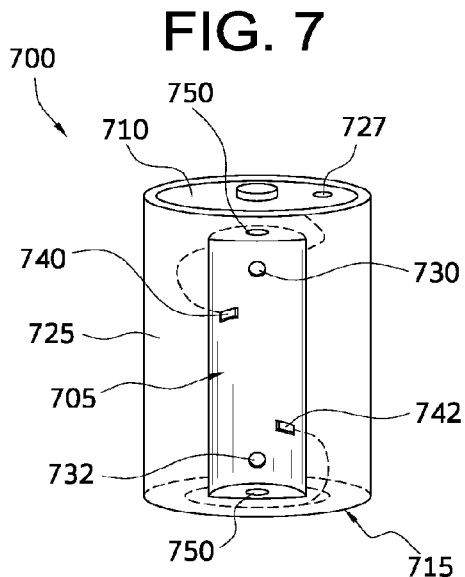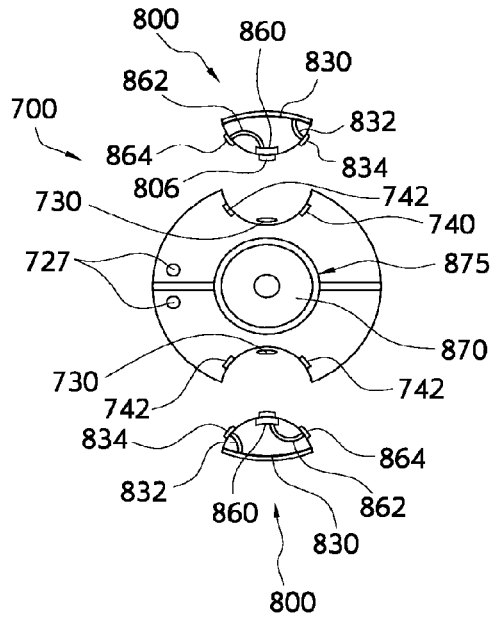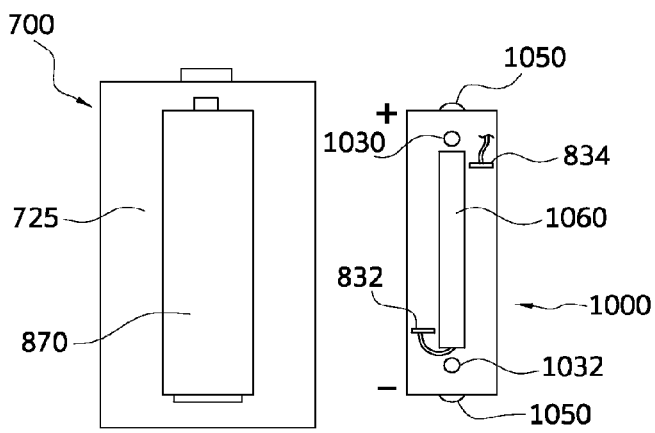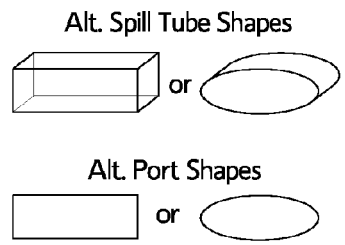

SELF-RECHARGING BATTERY APPARATUS AND METHOD OF OPERATION

CROSS-REFERENCE TO COPENDING APPLICATIONS

This application claims benefit of priority to Patent Cooperation Treaty Application Number PCT/US2012/068643, filed on Dec. 8, 2012, U.S. Provisional Patent Application No. 61/568,562, filed Dec. 8, 2011 and U.S. Provisional Patent Application No. 61/588,366, filed Jan. 19, 2012, all of which are incorporated herein in their entireties by reference.

FIELD OF THE INVENTION

This invention relates generally to rechargeable batteries, and more particularly, to non-electric or green-powered, i.e., saltwater-powered, self-recharging batteries.

BRIEF DESCRIPTION OF DRAWINGS

Non-limiting and non-exhaustive embodiments of the present invention are described with reference to the following figures, wherein like reference numerals and/or indicia refer to like parts throughout the various views unless otherwise precisely specified.

FIG. 1 is a side perspective view of a self-recharging battery, in accordance with an embodiment of the present invention.

FIG. 2 is an exploded side perspective view of the self-recharging battery of FIG. 1, in accordance with an embodiment of the present invention.

FIG. 3A is a top view of the self-recharging battery of FIG. 1 without the top cover piece, in accordance with an embodiment of the present invention.

FIG. 3B is a top view of the self-recharging battery of FIG. 1 with the top cover piece, in accordance with an embodiment of the present invention.

FIG. 4 is a bottom view of the self-recharging battery of FIG. 1 with the top cover piece, in accordance with an embodiment of the present invention.

FIG. 5 is a partially exploded side perspective view of the internal, top and bottom components of the self-recharging battery of FIG. 1, in accordance with an embodiment of the present invention.

FIG. 6 is a partially exploded side perspective view of the self-recharging battery of FIG. 1, in accordance with an embodiment of the present invention.

FIG. 7 is a side perspective view of a self-recharging battery with replaceable anode-cathode components, in accordance with an embodiment of the present invention.

FIG. 8 is a partially exploded, top, cross-sectional view of a self-recharging battery with replaceable anode-cathode components, in accordance with an embodiment of the present invention.

FIG. 9 is a side cross-sectional view of a self-recharging battery of FIG. 7 showing the relative position of the rechargeable battery within the self-recharging battery, in accordance with an embodiment of the present invention.

FIG. 10 is a cross-sectional side view of an anode-cathode component of a self-recharging battery with the cathode and cathode wall removed, in accordance with an embodiment of the present invention.

FIG. 11A is a front-side view of a re-sealable gasket for use in a spill port in a recess for an anode-cathode component in a self-recharging battery with a single vertical or horizontal re-sealable perforation, in accordance with an embodiment of the present invention.

FIG. 11B is a front-side view of a re-sealable gasket for use in a spill port in a recess for an anode-cathode component in a self-recharging battery with three substantially equally spaced perforations radiating outwardly from a center of the gasket, in accordance with an embodiment of the present invention.

FIG. 11C is a front-side view of a re-sealable gasket for use in a spill port in a recess for an anode-cathode component in a self-recharging battery with four substantially equally spaced perforations radiating outwardly from a center of the gasket, in accordance with an embodiment of the present invention.

FIG. 11D is a front-side view of an "O"-ring gasket for use in a spill port in a recess for an anode-cathode component in a self-recharging battery, in accordance with an embodiment of the present invention.

DETAILED DESCRIPTION OF ILLUSTRATED EMBODIMENTS

Figure 12:
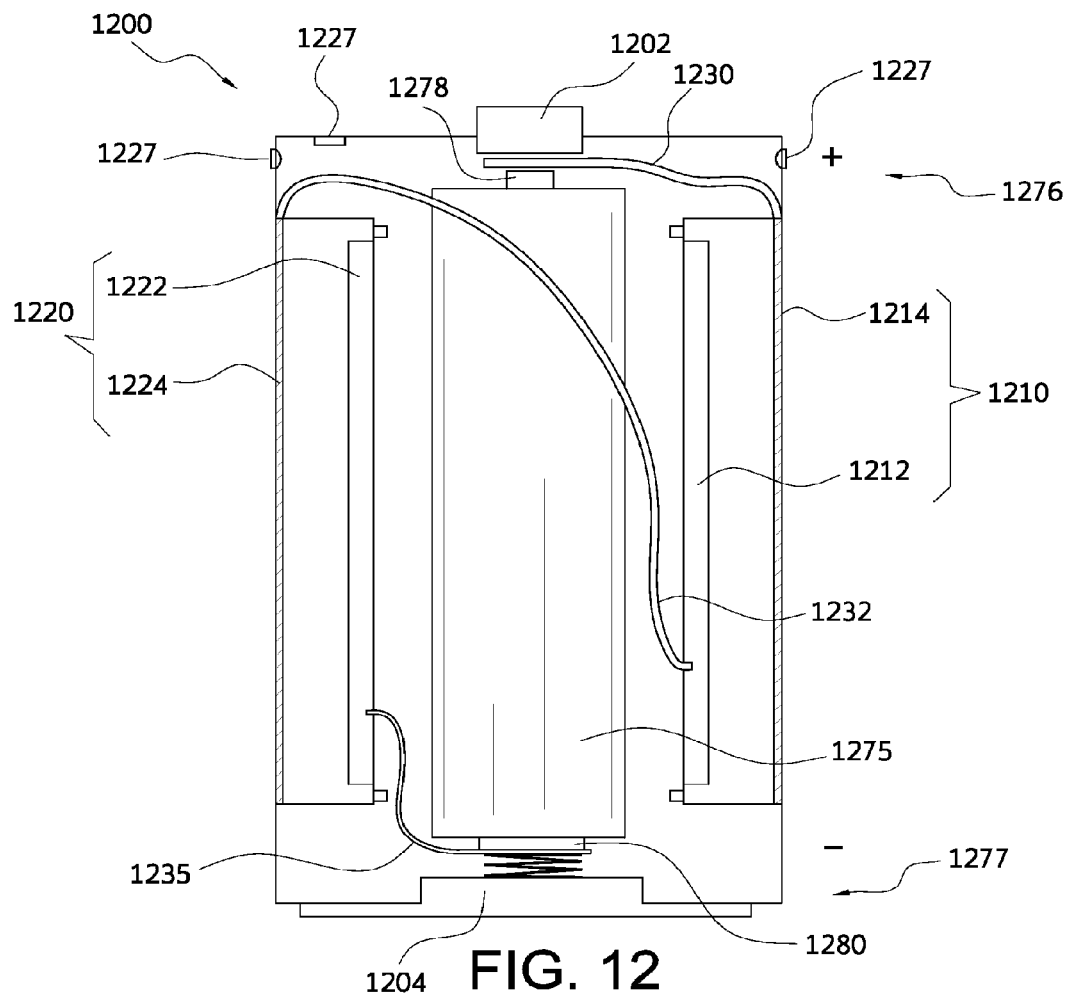
FIG. 12 is a side cross-sectional view of an assembled self-recharging battery, in accordance with an embodiment of the present invention.

In accordance with some, but not all embodiments of the present invention, a self-recharging battery includes (i.e., comprises) a AA rechargeable battery positioned inside a cylinder having the same size and configuration (i.e., height, diameter and external connections) as a "C" or "D" size battery case. The AA rechargeable battery is further contained in a conformal watertight sleeve and the AA rechargeable battery is made to touch the positive and negative terminals of the "C" or "D" sized battery case. Outside the watertight sleeve is an annular space between the sleeve and the "C" or "D" sized battery case interior wall. On opposite sides of the sleeve side of the annular space is mounted a small magnesium anode and, on the interior wall of the "C" or "D" sized battery case and generally directly opposite the anodes will be a cutout opening covered by an air-cathode. When filled with approximately 10 CC 7% salt solution water, the fuel cell created in the annular space of the "C" or "D" sized battery case will produce electricity and charge the AA rechargeable battery as needed when the "C" or "D" sized battery case is removed from the device it is powering and is allowed to stand in open air. In general, the AA rechargeable battery will be recharged in approximately one hour and the fuel cell will output 1.2-1.4 V under a load, depending on the number and configuration of the anodes and cathodes. Currently, it is estimated that each self-recharging battery can be recharged about ten (10) times without having to replace the water or anodes.

In alternative embodiments, one or more AAA rechargeable batteries may be used instead of the AA rechargeable battery. In accordance with embodiments of the invention, and regardless of battery size, there may be two anodes and two cathodes arranged in series, or two anodes and two cathodes arranged in parallel, or one anode and one cathode. Further, the "C" and "D" cell sized battery cases described and shown in the embodiments herein are merely illustrative of the inventive concept of the present invention, and other embodiments of different sized battery cases, for example, 6 V, 9 V, etc., and different numbers and sizes of rechargeable batteries used therein.

When the self-recharging battery is placed into a device to be powered, it functions as a battery because there is insufficient air available for the fuel cell to function properly. However, when the self-recharging battery is removed from the device it is powering, the magnesium-air fuel cell instantly begins to charge the self-recharging battery without the aid of any other charger or device.

Contemplated uses for the magnesium-air fuel cell include being: 1) a direct replacement for AAA, AA, C, D, 6V and 9V batteries as well as special purpose batteries such as camera batteries and other personal electronics batteries; 2) a battery charger for all types of dry cell batteries including, but not limited to: AAA, AA, C, D, 6V and 9V batteries as well as special purpose batteries such as camera batteries, cell phones and other personal electronics batteries; 3) a battery charger for all types of wet cell batteries including, but not limited to: motorcycle batteries, automotive batteries and deep cycle marine batteries; 4) a direct propulsion power for robots and other autonomous vehicles used in the air and on the sea or ground; 5) an onboard battery charger for all types of watercraft both power and sail; 6) a direct power source for maritime equipment such as life jacket lights, marker buoy lights, navigation lights, life raft lights; 7) a battery charger and hybrid power source for camping, hunting, fishing, kayaking, boating, skiing, hiking, biking, sailing devices and equipment; 8) a battery charger and hybrid power source for emergency and disaster response; 9) a battery charger and hybrid power source for remote cabins and other dwellings; and 10) a long term shelf life (e.g., decades) power source for survival equipment.

FIG. 1 is a side perspective view of a self-recharging battery, in accordance with an embodiment of the present invention. In FIG. 1, a fully assembled "D" sized self-recharging battery 100 showing a top or positive end 110 with a protruding connector 112, a right longitudinal opening 120 formed in a side 125 of the self-recharging battery 100 with a right cathode and wire mesh screen 130 covering an inside of the longitudinal opening 120. Two vent/fill holes or openings 127 are shown defined within the side 125 and located adjacent the top end 110 of the self-recharging battery 100 and permit the introduction of a saline or other electrolytic solution into an interior of the self-recharging battery 100 and the escaping of any excess gas contained or produced within the self-recharging battery 100 while preventing the escape of saline/electrolyte. The vent/fill holes 127 are constructed by, for example, but not limited to, forming the vent/fill holes 127 as part of the manufacturing process of the body or, after the body is made, by boring or drilling the vent/fill holes 127 into the side of the side 125 and backing each hole with a self-sealing rubber dam that allows a needle like device to be inserted and fill the fuel cells with salt water or other electrolytic liquid. When the needle like device is removed the rubber dam self-seals to prevent leakage of the liquid electrolyte while permitting the escape of excess gas that is contained or produced inside the body 125 during the recharging operation.

FIG. 2 is an exploded side perspective view of the self-recharging battery of FIG. 1, in accordance with an embodiment of the present invention. In FIG. 2, the individual components of the "D"-sized self-recharging battery 100 in FIG. 1 are shown to include the top or positive end 110 with the protruding connector 112; a left half of a body portion 240 with a left half longitudinal opening (not shown) formed in the side 125 of the left half of the body portion 240 and a left cathode and wire mesh screen 230 covering an inside of the left longitudinal opening (not shown); a right half of the body portion 250 with the longitudinal opening 120 formed in the side 125 of the right half of the body portion 250 and the right cathode and wire mesh screen 230 covering an inside of the longitudinal opening 120; the right anode 260 is connected in series to the left cathode 230 via an insulated bus bar or wire 262; the right cathode 130 is connected to a top positive (+) end of an enclosed AA rechargeable battery 270 and also the protruding connector 112 via an insulated bus bar or wire 132; a switch (not shown) may be installed in series with the connecting wire to turn the fuel cell on or off to increase longevity. Similarly, a rotating sleeve (not shown, but see FIGS. 14, 17-25 and 28) may be inserted around, or just inside of the "D" sized battery 100 to make the device air tight and, in concert with the switch, completely isolate the enclosed AA rechargeable battery 270 from the fuel cells; a base 115 with a metal contact disk 117 on an inside side of the base and a spring 119 substantially centered on and extending upwardly from the metal contact disk 117, which extends through the base 115 and is available on the outside of the base (not shown in FIG. 2, but see FIG. 4), an "L"-shaped metal connector piece 280 connected to and extending outwardly from an outer edge of the circumference of the metal contact disk 117 and along the inside of the base to near the outer diameter of the base where it bends and extends substantially perpendicularly upwardly away from the base to connect to a second anode 290; the second anode 290 is connected to one end of a first bus bar 132, for example, but not limited to a brass bus bar 132, that is connected at an opposite end to the left cathode and wire mesh screen 230; a second bus bar 262, for example, but not limited to a brass bus bar, that is connected at one end to the right cathode and wire mesh screen 130 and the other end is positioned between the bottom of the top and the top of the rechargeable battery; a sleeve or separator 275, which may be constructed of acetate or similar material, and that includes a substantially cylindrical body 276 with a central opening 273 extending there through and sized to fit a AA sized rechargeable battery 270 and a pair of opposite longitudinal flanges 277a, 277b extending radially outwardly from an outer surface of the substantially cylindrical body 276; and a AA sized rechargeable battery 270. When the self-recharging battery is fully assembled, the outer edges 278a, 278b of the pair of opposite longitudinal flanges 277a, 277b may be fixed between longitudinal edges of the two body portions 240, 250 or be inside of the two body portions 240, 250, as seen in FIG. 3, and/or make contact with inner sides of the body portions 240, 250 to hold the rechargeable battery in a substantially central position within the rechargeable battery to maintain connection with the top and bottom metal connectors. In some, but not all, embodiments the sleeve forms a watertight seal around the rechargeable battery and the top and bottom metal plates to prevent or at least minimize corrosion of the metal by the electrolyte solution and/or other moisture.

FIG. 3A is a top view of the self-recharging battery of FIG. 1 without the top cover piece, in accordance with an embodiment of the present invention. In FIG. 3A, the position of the rechargeable battery 270, sleeve/separator 275 and anodes 290, 260 may be seen.

FIG. 3B is a top view of the self-recharging battery of FIG. 1 showing the top cover piece 110 and the protruding connector 112, in accordance with an embodiment of the present invention. In FIG. 3B, the top of the self-recharging battery 110.

FIG. 4 is a bottom view of the self-recharging battery of FIG. 1 with the bottom cover piece 115, in accordance with an embodiment of the present invention. In FIG. 4, a bottom side of the metal disk 117 may be seen extending through and generally slightly beyond the bottom of the self-recharging battery cover piece 115.

FIG. 5 is a partially exploded side perspective view of the internal, top and bottom components of the self-recharging battery of FIGS. 1 and 2, in accordance with an embodiment of the present invention.

FIG. 6 is a partially exploded side perspective view of the self-recharging battery of FIGS. 1 and 2, in accordance with an embodiment of the present invention.

FIG. 7 is a side perspective view of a self-recharging battery that uses replaceable anode-cathode components (see 1000 in FIG. 10), in accordance with an embodiment of the present invention. In FIG. 7, a self-recharging battery 700 is shown and configured to have the same dimensions and features as a standard D-Cell battery. The self-recharging battery 700 includes two anode-cathode recesses 705 in the body 725 and on opposite sides of the self-recharging battery 700. The inside of each recess 705 is configured identically to enable having only a single anode-cathode component configuration. Specifically, the recess 705 has a substantially cylindrical cross-sectional shape with a height that extends from adjacent a top end of the body to adjacent a bottom end of the body and extends inwardly from an outside wall of the body 725 in a substantially concave arc. The recess also includes an upper spill/fill port 730 and a lower spill/fill port 732 axially aligned with a central axis of the self-recharging battery and positioned substantially along a back center line of the arc. A vent/fill port 727 is located in the top surface of the self-recharging battery 100 and is used to provide a vent for escaping gases and also to fill the self-recharging battery 100 with electrolyte, e.g., but not limited to, saltwater, seawater, saltwater and sodium citrate, or some other electrolytic liquid. The vent/fill port 727 is designed to be re-sealable and to permit the insertion of a needle to fill the interior of the self-recharging battery with electrolyte and not permit the electrolyte to escape when the needle is removed, while allowing gas produced by the fuel cell when recharging the rechargeable battery to escape. To ensure the correct orientation of each anode-cathode component in any recess, and in addition to orientation indicia on the outside wall of the anode-cathode component, the vent/fill holes 727 can be of different sizes (e.g., but not limited to, the upper hole is larger or shaped differently than the lower hole (e.g., oval vs. circular), or positioned in an offset manner so only the correct orientation of the anode-cathode component will mate with the holes.

In FIG. 7, a female cathode connector 740 is shown on a left side and near a top of the recess 705 and a female anode connector 742 is shown on a right side and near a bottom of the recess 705. The cathode connectors can be insertion type connectors designed to accept and retain male blade or wire connectors on the anode-cathode component (see 1000 in FIG. 10) as well as simple contact and/or pressure contact connectors that permit a connection to be made by direct surface contact with the other connector.

In FIG. 7, a fastening indent 750 is shown in each of the top and bottom of the anode-cathode recess 705 and arranged to releasingly engage detents 1050 that are located on the cooperating top and bottom surfaces of the anode-cathode component (see 1000 in FIG. 10). Alternative designs do not include the indents and detents. In other alternative designs, the anode-cathode component 1000 can have one or more spring clip connectors at the top and/or bottom and the top and bottom of the recess can have a cooperating edge to releaseably engage the spring clip.

Alternative embodiments of the self-recharging battery include C-Cell, 9-Volt, etc. as described above.

FIG. 8 is a partially exploded, top, cross-sectional view of the self-recharging battery 700 in FIG. 7 with replaceable anode-cathode components 800, in accordance with an embodiment of the present invention. In FIG. 8, a watertight enclosure 875 with opposing flanges is shown surrounding and enclosing a rechargeable battery 870 and preventing it from getting wet when the self-recharging battery is filled with the electrolyte. The opposing flanges are fixedly attached to an interior of the body to hold the rechargeable battery firmly in place in and axially aligned with the center of the body. Each anode-cathode component 800 includes a cathode 830 affixed to an inside of an outer wall of the anode-cathode component 800 and covers an inside of a window (not shown) formed in the outer wall. An anode 860 is attached to an inner wall of the anode-cathode component 800 and electrically connected to a male anode connector 864 by an anode bus bar 862. A cathode 830 is attached to the outer wall and electrically connected to a male cathode connector 834 by a cathode bus bar 832. A top spill port tube 806 is seen passing through the inner wall about the anode 860.

FIG. 9 is a side cross-sectional view of a self-recharging battery of FIG. 7 showing the relative position of the rechargeable battery 875 within the self-recharging battery 700, in accordance with an embodiment of the present invention.

FIG. 10 is a cross-sectional side view of an anode-cathode component of a self-recharging battery with the cathode and cathode wall removed, in accordance with an embodiment of the present invention. In FIG. 10, an anode 1060 extends between the top and bottom spill/fill ports 1030, 1032. In general, the anode 1060 is made of magnesium and has a substantially rectangular shape with dimensions of about ¼" wide×about ⅛" deep×about 1¼" long.

FIG. 11A is a front-side view of a re-sealable gasket 1100 for use in a spill port 1030 in a recess 705 for an anode-cathode component 1000 in a self-recharging battery 700 with a single vertical or horizontal re-sealable perforation 1110, in accordance with an embodiment of the present invention. In FIG. 11A, the gasket 1100 includes an outer ring 1105 that is about twice as thick as the thickness of the wall of the anode-cathode component and has a substantially flat and perforated center portion 1110 connected to an inside circumferential edge of the outer ring. In general, a groove (not shown) extends around an outside circumferential edge of the outer ring of the gasket and the groove is sized and configured to fit around and seal around an edge of the spill/fill port 730, 732. When a fill tube is inserted into the gasket in the spill/fill port 730, 732 the re-sealable perforation 1110 opens to permit the fill tube to pass through and seals around an outer surface of the fill tube. Although the re-sealable gasket 1100 in FIG. 11A is substantially circular, alternative shapes are also contemplated, for example, but not limited to, substantially oval or substantially rectangular. The perforation may also be oriented at an angle between the vertical and horizontal.

FIG. 11B is a front-side view of a re-sealable gasket 1120 for use in a spill port 730, 732 in a recess for an anode-cathode component 1000 in a self-recharging battery 700 with three substantially equally spaced perforations 1130a, 1130b, 1130c radiating outwardly from a center of the gasket, in accordance with an embodiment of the present invention. In general, the configuration of the gasket 1120 in FIG. 11B is substantially the same as the gasket in FIG. 11A, except that, in FIG. 11B, there are three substantially equally spaced perforations 1130a, 1130b, 1130c in the gasket 1120 instead of just a center perforation 1110. Although the re-sealable gasket 1120 in FIG. 11B is substantially circular, alternative shapes are also contemplated, for example, but not limited to, substantially oval or substantially rectangular.

FIG. 11C is a front-side view of a re-sealable gasket 1140 for use in a spill port 730,732 in a recess 705 for an anode-cathode component 1000 in a self-recharging battery 700 with four substantially equally spaced perforations 1150a, 1150b, 1150c, 1150d radiating outwardly from a center of the gasket, in accordance with an embodiment of the present invention. In general, the configuration of the gasket 1140 in FIG. 11B is substantially the same as the gaskets 1110, 1120 in FIGS. 11A and 11B, except that, in FIG. 11C, the four substantially equally spaced perforations 1150a, 1150b, 1150c, 1150d in the gasket 1140 instead of one or three as in FIGS. 11A and 11B. Although the re-sealable gasket 1140 in FIG. 11C is substantially circular, alternative shapes are also contemplated, for example, but not limited to, substantially oval or substantially rectangular.

FIG. 11D is a front-side view of an "O"-ring gasket 1160 for use in a spill port 730, 732 in a recess 705 for an anode-cathode component 1000 in a self-recharging battery 700, in accordance with an embodiment of the present invention. In FIG. 11D, the "O"-ring gasket 1160 includes a ring 1165 with an outer circumferential groove that is substantially similar to the grooves in FIGS. 11A-C, but instead of having a perforated center portion as seen in FIGS. 11A-C, the "O"-ring has an open center 1170.

FIG. 12 is a side cross-sectional view of an assembled self-recharging battery 1200, in accordance with an embodiment of the present invention. In FIG. 12, the anode-cathode pairs are shown connected in series with a cathode 1214 in a first pair 1210 connected at a positive end 1276 of the self-recharging battery 1275 to and between a top contact 1278 of a rechargeable battery and a top contact of the self-recharging battery 1202 by a cathode bus bar 1230. An anode 1212 in the first pair is connected to a cathode 1224 in a second pair 1220 by an anode-cathode bus bar 1232 and the cathode 1224 in the second pair 1220 is connected at a negative end 1277 of the self-recharging battery to and between a bottom contact 1280 of the rechargeable battery 1275 and a bottom contact 1204 of the self-recharging battery by an anode bus bar 1235. In FIG. 12, vent/fill holes 1227 can be located in the top of the self-recharging battery as well as on the side of and, generally, near the top of the self-recharging battery 1200.

Figure 13:
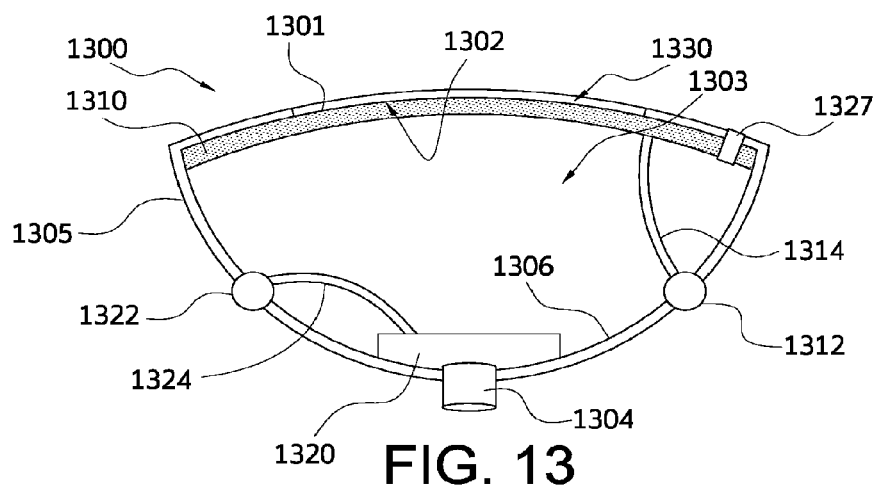
FIG. 13 is a top, cross-sectional view of an anode-cathode component of a self-recharging battery, in accordance with an embodiment of the present invention.

FIG. 13 is a top, cross-sectional view of an anode-cathode component 1300 of a self-recharging battery, in accordance with an embodiment of the present invention. In FIG. 13, a cathode 1310 is seen attached to and extending substantially across the width and height of an inner side 1302 of a front wall 1301 of and covering a cathode window opening 1330 the anode-cathode component 1300. Although a vent/fill hole 1327 is shown in FIG. 13 in the front wall of the anode-cathode component, other embodiments are contemplated in which there is no vent/fill hole. Anode 1320 is seen attached to an inner side 1306 of a back wall 1305 and electrically connected to a male anode connector 1322 that is disposed in the back wall 1305 by an anode bus bar 1324. Similarly, the cathode 1310 is electrically connected to a male cathode connector 1312 by a cathode bus bar 1314. The anode-cathode component has an open cavity 1303 to electrolyte and while cathode 1310 is air-permeable it is not water permeable, so the electrolyte does not leak through the cathode. The male anode connectors shown in FIG. 13 are shown to be substantially spherical and as such can be electrically connected with substantially flat or concave female anode connectors.

Figure 14:
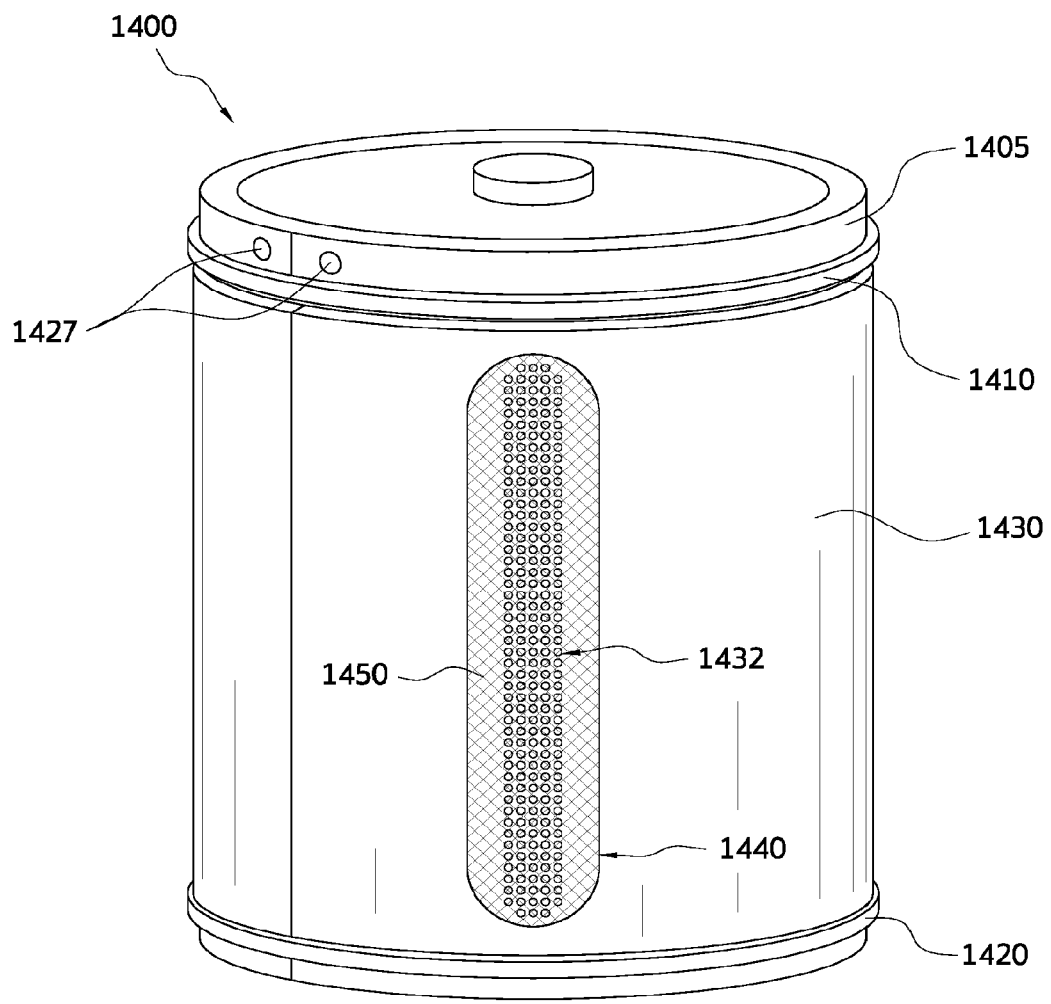
FIG. 14 is a side perspective view of a self-recharging battery with upper and lower retaining ribs and a rotatable sleeve with perforations/air holes surrounding a body of the self-recharging battery and retained between the ribs, in accordance with an embodiment of the present invention.

FIG. 14 is a side perspective view of a self-recharging battery 1400 with upper and lower retaining ribs 1410, 1420 and a rotatable sleeve 1430 with perforations/air holes 1432 surrounding a body 1405 of the self-recharging battery 1400 and retained between the ribs 1410, 1420, in accordance with an embodiment of the present invention. In FIG. 14, the perforations 1432 are shown located above a cathode window 1440, which is considered an uncovered position that permits air to contact a cathode 1450 to permit the self-recharging battery 1400 to recharge the rechargeable battery (not shown). When the perforations 1432 are not located above a cathode window 1440, i.e., in a covered position, there is insufficient air reaching the cathode 1450 to permit the necessary amount of electricity to be produced to provide any significant recharging of the rechargeable battery. The rotatable sleeve 1430 is able to freely rotate around the self-charging battery 1400 and between the retaining ribs 1410, 1420, and can be made from any suitable flexible plastic or other flexible and non-air-permeable material that can be clear, opaque or not opaque.

Figure 15:
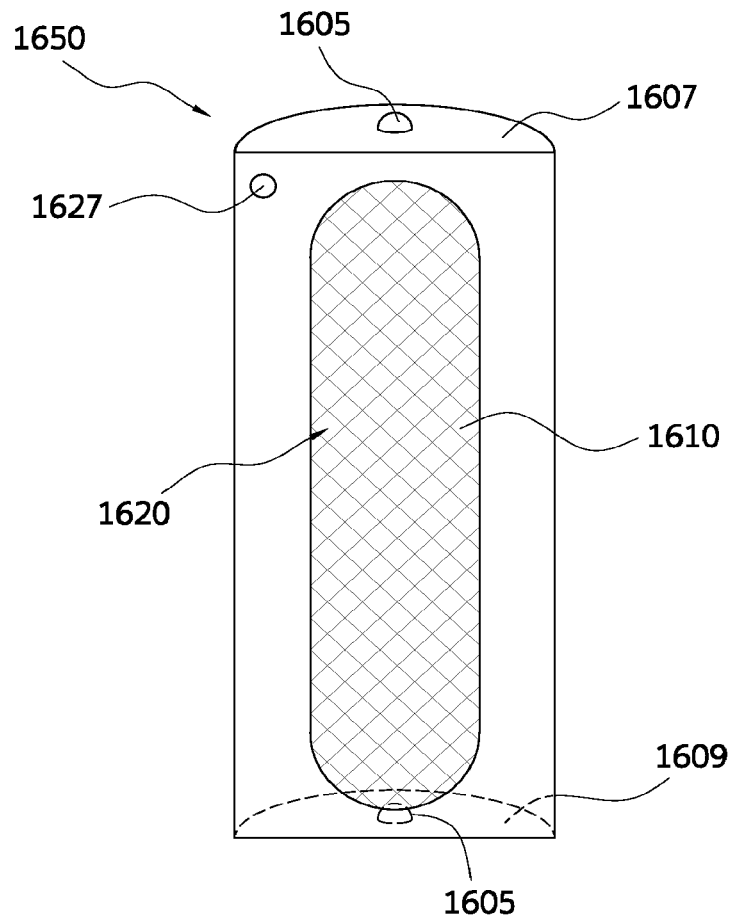
FIG. 15 is a top view of the self-recharging battery with upper and lower retaining ribs of FIG. 14, in accordance with an embodiment of the present invention.

FIG. 15 is a top view of the self-recharging battery 1400 with upper and lower retaining ribs 1410, 1420 of FIG. 14, in accordance with an embodiment of the present invention. As seen in FIG. 15, the top retaining rib 1410 extends outwardly and slightly away from the outer wall of the body of the self-recharging battery 1400.

Figure 16:
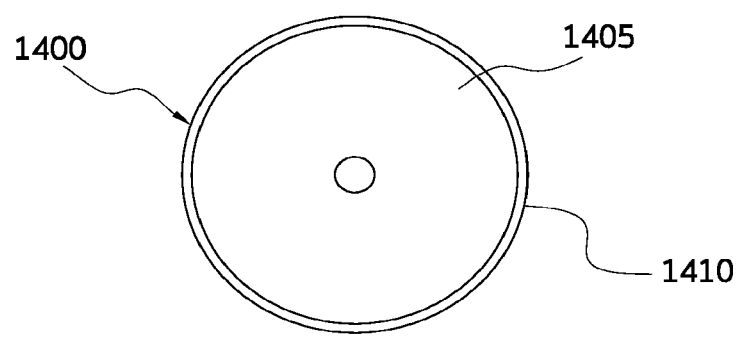
FIG. 16 is a front perspective view of a replaceable anode-cathode component of a self-recharging battery, in accordance with an embodiment of the present invention.

FIG. 16 is a front perspective view of a replaceable anode-cathode component 1600 of a self-recharging battery, in accordance with an embodiment of the present invention. In FIG. 16, a back side of a water-tight and air-permeable cathode 1610 is seen through a window 1620 formed in a front of the anode-cathode component 1600. An optional male detent 1605 is shown in each of a top end 1607 and a bottom end 1609 of the anode-cathode component and adapted and configured to cooperate with the female indents in FIG. 7. An alternative embodiment for a connecting device includes, for example, but is not limited to, a fish bone connector that releases when a tool is pushed into the center of the connector.

Figure 17:
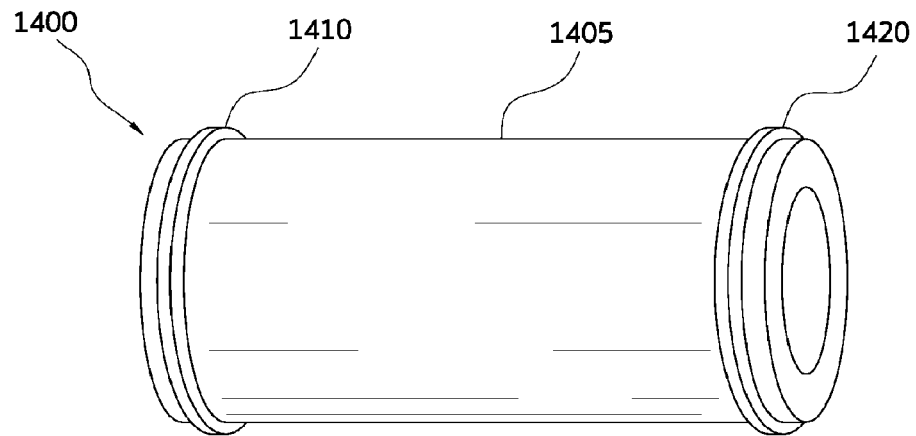
FIG. 17 is another side perspective view of the self-recharging battery of FIG. 14 without the rotatable sleeve and showing the extension of the upper and lower retaining ribs away from the body of the self-recharging battery, in accordance with an embodiment of the present invention.

FIG. 17 is another side perspective view of the self-recharging battery 1400 of FIG. 14 without the rotatable sleeve showing the extension of the upper and lower retaining ribs 1410, 1420 away from the body 1405 of the self-recharging battery 1400, in accordance with an embodiment of the present invention.

Figure 18:
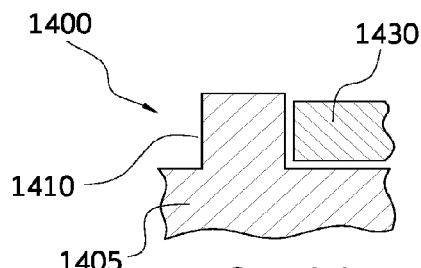
FIG. 18 is a close-up partial cross-sectional view of a retaining rib of FIG. 14 showing its relationship to the rotatable sleeve and the extension of the rib away from the body of the self-recharging battery, in accordance with an embodiment of the present invention.

FIG. 18 is a close-up partial cross-sectional view of a retaining rib 1410 of FIGS. 14 and 17 showing its relationship to the rotatable sleeve 1430 and the extension of the rib 1410 away from the body 1405 of the self-recharging battery 1400, in accordance with an embodiment of the present invention.

Figure 19:
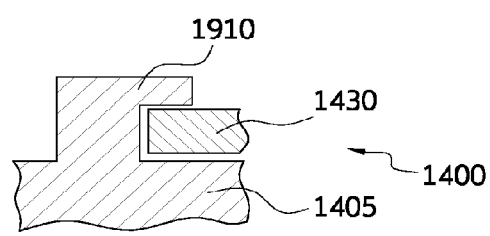
FIG. 19 is a close-up partial cross-sectional view of an alternative configuration of the retaining rib of FIG. 14 with an overhanging flange and showing its relationship to the rotatable sleeve and the extension of the rib away from the body of the self-recharging battery, in accordance with an embodiment of the present invention.

FIG. 19 is a close-up partial cross-sectional view of an alternative configuration of the retaining rib 1410 of FIG. 14 with an overhanging flange 1910 and showing its relationship to the rotatable sleeve 1430 and the extension of the rib 1410 away from the body 1405 of the self-recharging battery 1400, in accordance with an embodiment of the present invention.

Figure 20:
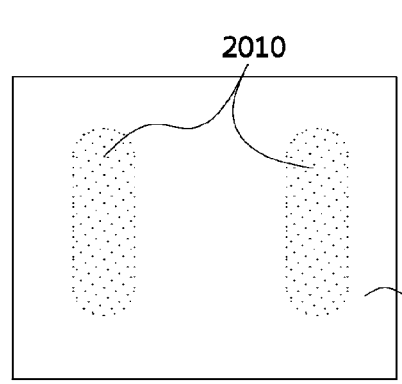
FIG. 20 is a plan view of an unrolled rotatable sleeve showing the locations of two sections of perforations/air holes for use with a self-recharging battery, in accordance with an embodiment of the present invention.

FIG. 20 is a plan view of an unrolled sheet 2000 for use in making a rotatable sleeve showing the locations of two sections of perforations/air holes 2010 for use with a self-recharging battery, in accordance with an embodiment of the present invention. In FIG. 20, the two perforation areas 2010 are spaced apart from each other by a predetermined distance so that they are on substantially opposite sides of a cylinder that is created when the sheet 2000 is rolled to form the rotatable sleeve and simultaneously align with the cathode windows in the self-recharging battery of for example, FIG. 14. If this type of sleeve is used with the replaceable anode-cathode component self-recharging battery embodiment described above, the sleeve must be removed before the anode-cathode components can be replaced and either returned to its position around the self-recharging battery or replaced with a new rotatable sleeve.

Figure 21:
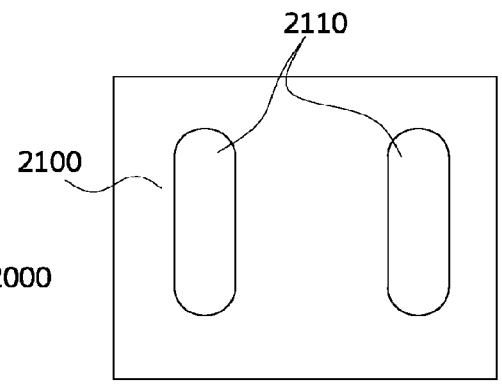
FIG. 21 is a plan view of another unrolled rotatable sleeve showing the locations of two openings in the rotatable sleeve for use with a self-recharging battery having replaceable anode-cathode components, in accordance with an embodiment of the present invention.

FIG. 21 is a plan view of another unrolled rotatable sleeve 2100 showing the locations of two openings 2100 in the rotatable sleeve for use with a self-recharging battery having replaceable anode-cathode components as described above, in accordance with an embodiment of the present invention. In FIG. 21, the two open areas 2110 are spaced apart from each other by a predetermined distance so that they are on substantially opposite sides of a cylinder that is created when the sheet 2100 is rolled to form the rotatable sleeve and simultaneously align with the cathode windows in the self-recharging battery of, for example, FIG. 14. The openings 2110 are larger than the replaceable anode-cathode component of, for example, FIG. 16, so they can be left on the self-recharging battery while used anode-cathode components are replaced with new anode-cathode components.

Figure 22:
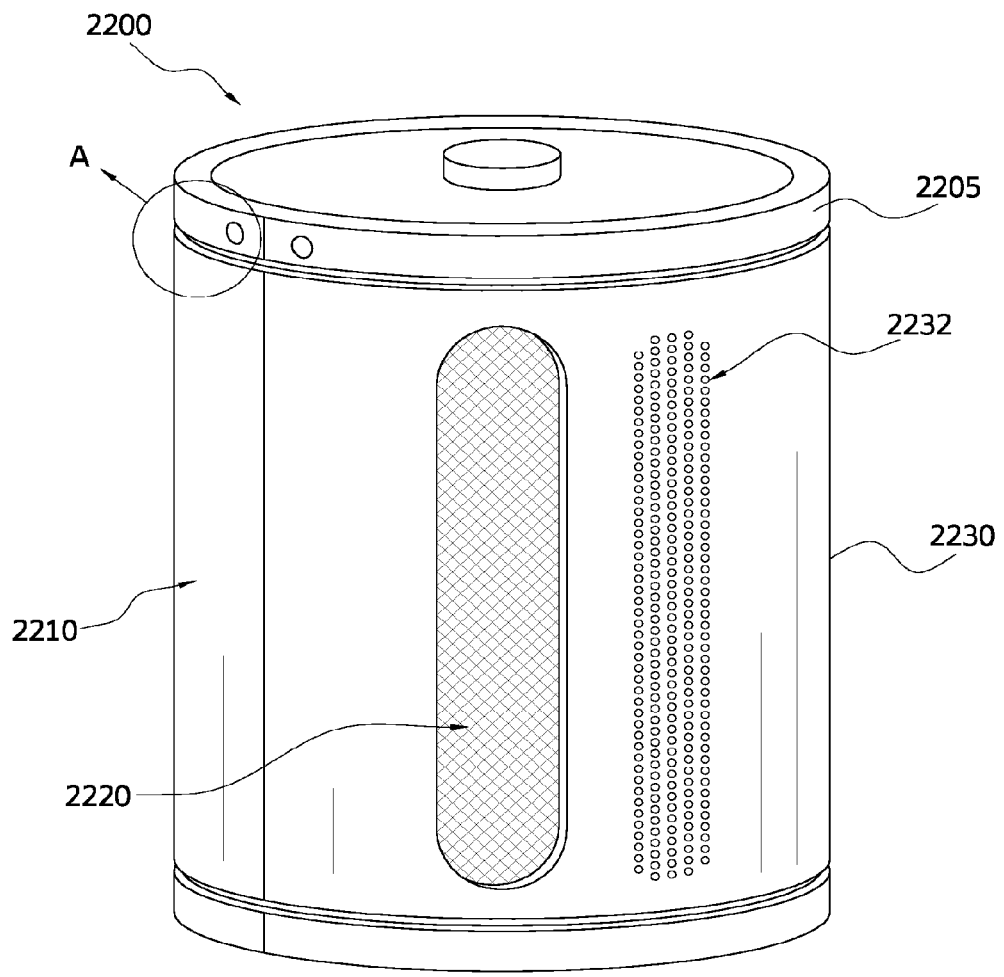
FIG. 22 is a side perspective view of a self-recharging battery with a recessed area extending from adjacent a top of the self-recharging battery to a bottom of the self-recharging battery having a rotatable sleeve with perforations/air holes positioned in the recessed area, in accordance with an embodiment of the present invention.

FIG. 22 is a side perspective view of a self-recharging battery 2200 with a recessed 2210 in a body 2205 of and area extending from adjacent a top of the self-recharging battery to a bottom of the self-recharging battery having a rotatable sleeve 2230 with perforations/air holes 2232 positioned in the recessed area, in accordance with an embodiment of the present invention. In FIG. 22, the rotatable sleeve 2230 is shown installed in and completely wrapped around the recessed area 2210 of the self-recharging battery 2200 with the perforations/air holes 2232 next to, but not over a cathode window 2220. In this position the self-recharging battery 2200 is covered and essentially not producing enough electricity to recharge the internal rechargeable battery (not shown) to an appreciable extent. To turn the self-recharging battery 2200 on, the sleeve is rotated to position the perforations/air holes over the cathode window.

Figure 23:
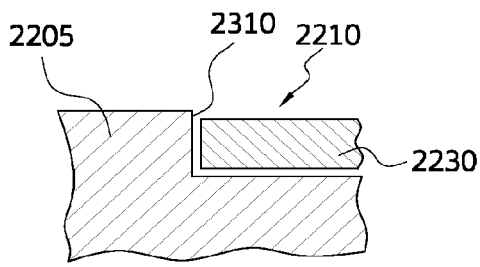
FIG. 23 is a cross-sectional, close up view of Section A of FIG. 22 showing an edge in a side of a body in a self-recharging batter defining a boundary of a recessed area in the body and showing the placement of a rotatable sleeve in the recessed area, in accordance with an embodiment of the present invention.

FIG. 23 is a cross-sectional, close up view of Section A of FIG. 22 showing an edge 2310 in a side of the body 2205 in the self-recharging battery 2200 defining a boundary of the recessed area 2210 in the body and showing the placement of the rotatable sleeve 2230 in the recessed area 2210, in accordance with an embodiment of the present invention.

Figure 24:
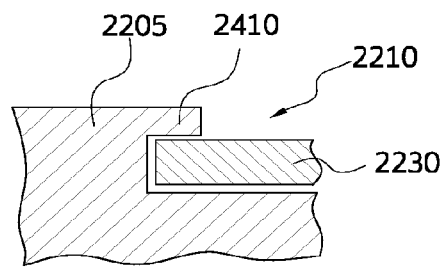
FIG. 24 is an alternative cross-sectional, close up view of Section A of FIG. 22 showing a flanged edge in a side of a body in a self-recharging battery defining a boundary of a recessed area in the body and showing the placement of a rotatable sleeve in the recessed area and under the flanged edge, in accordance with an embodiment of the present invention.

FIG. 24 is an alternative cross-sectional, close up view of Section A of FIG. 22 showing a flanged edge in a side of a body in a self-recharging battery defining a boundary of a recessed area in the body and showing the placement of a rotatable sleeve in the recessed area and under the flanged edge, in accordance with an embodiment of the present invention.

Figure 25:
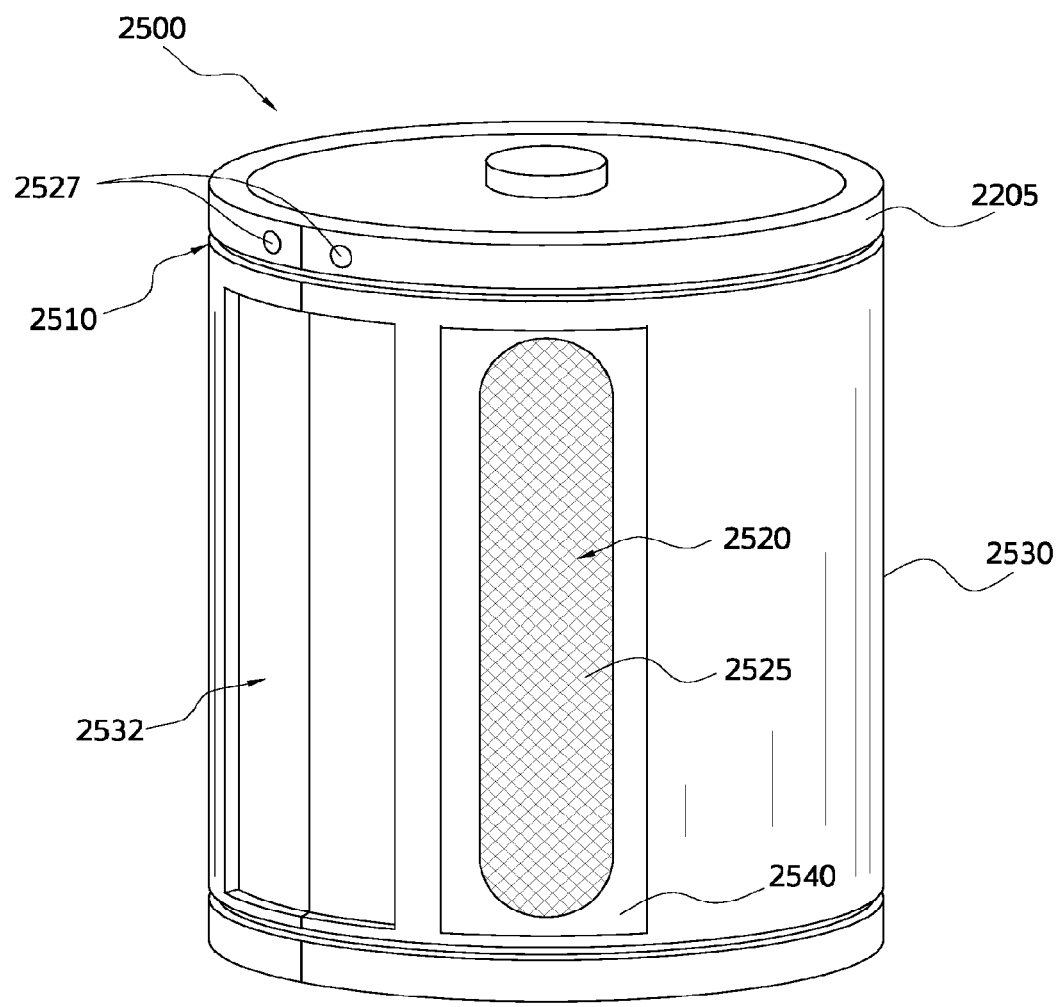
FIG. 25 is a side perspective view of a self-recharging battery with a recessed area extending from adjacent a top of the self-recharging battery to a bottom of the self-recharging battery with a rotatable sleeve having a window opening positioned in the recessed area, in accordance with an embodiment of the present invention.

FIG. 25 is a side perspective view of a self-recharging battery 2500 with a recessed area 2510 extending from adjacent a top of the self-recharging battery 2500 and just below a pair of vent/fill holes 2527 to a bottom of the self-recharging battery 2500 with a rotatable sleeve 2530 having a window opening 2532 positioned in the recessed area 2510, in accordance with an embodiment of the present invention. In FIG. 25, the self-recharging battery 2500 includes a removable anode-cathode component 2540, as described above, and window 2532 is generally sized to permit the removal and installation of anode-cathode components 2540 without having to remove sleeve 2530.

The recessed area structures shown in FIGS. 23 and 24 are also applicable for the use of the open window design of the rotatable sleeve of FIG. 25.

Figure 26:
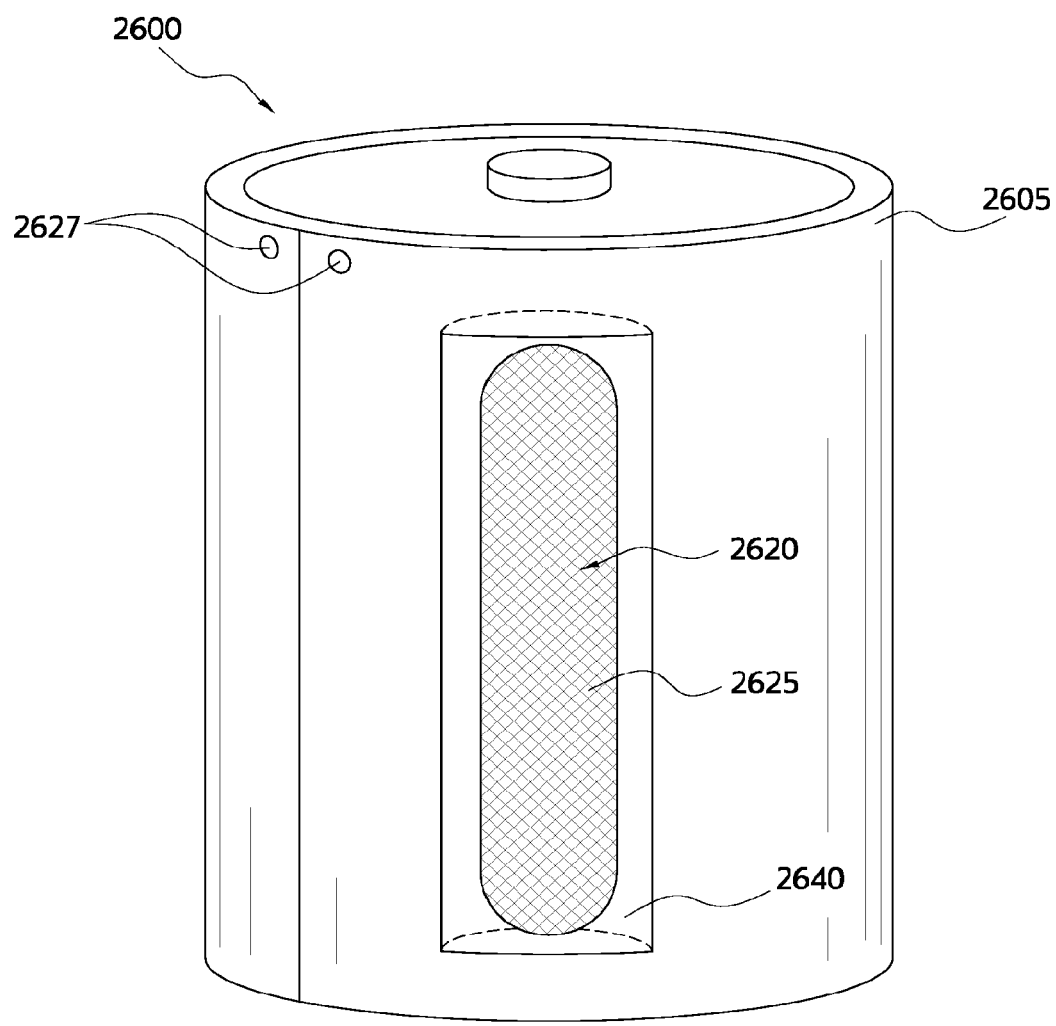
FIG. 26 is a side perspective view of a self-recharging battery with a replaceable anode-cathode component installed in an anode-cathode recess in an outside wall of a body of the self-recharging battery, in accordance with an embodiment of the present invention.

FIG. 26 is a side perspective view of a self-recharging battery 2600 with a replaceable anode-cathode component 2640 installed in an anode-cathode recess in an outside wall of a body 2605 of the self-recharging battery 2600, in accordance with an embodiment of the present invention. The anode-cathode component 2640 includes a window 2620 with a cathode 2625 covering an inside of the window 2620. In FIG. 26, a rotatable sleeve is not installed around the self-recharging battery 2600. A pair of vent/fill holes 2627 are seen adjacent the top of the self-recharging battery 2600.

Figure 27:
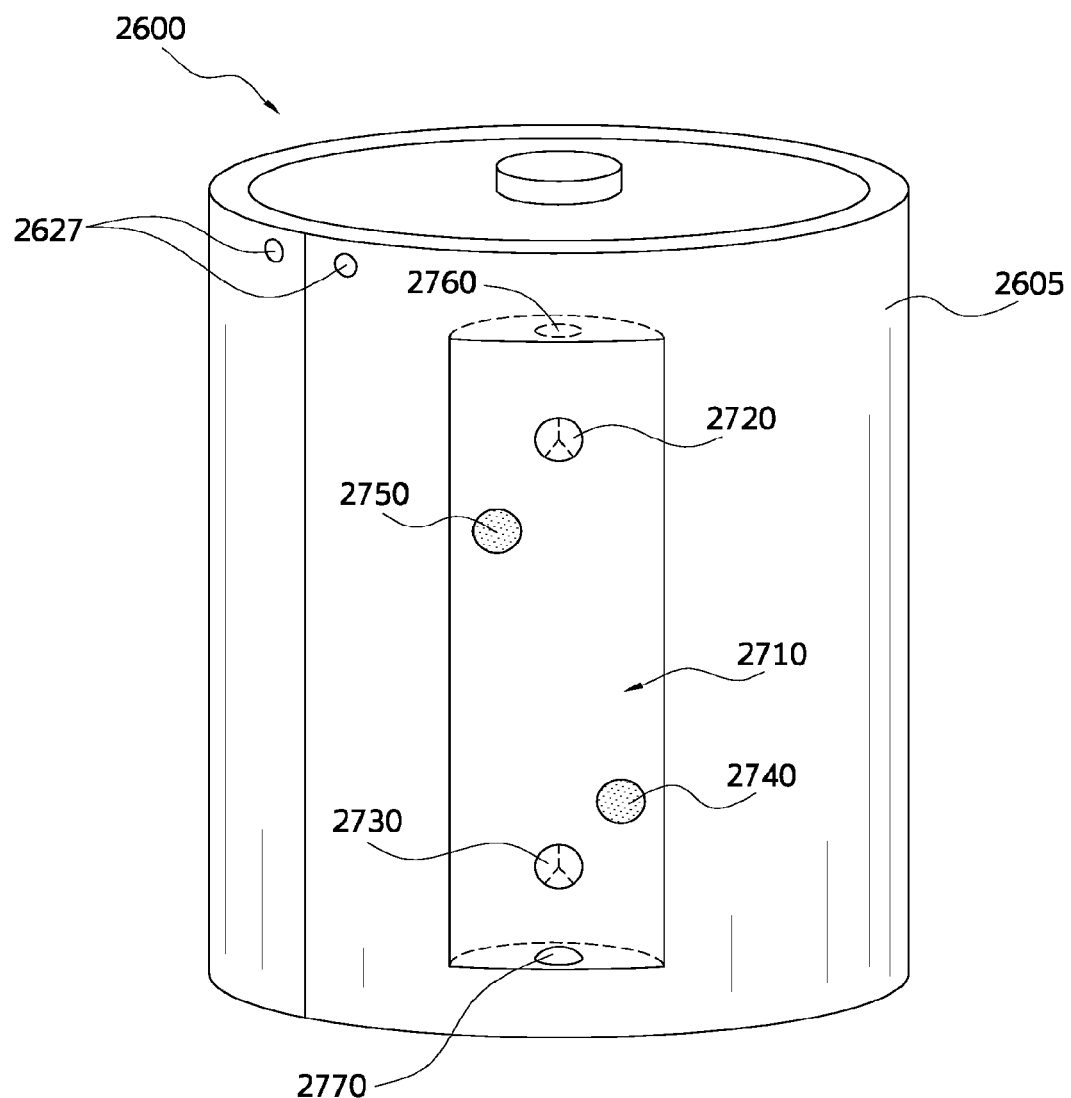
FIG. 27 is a side perspective view of t self-recharging battery of FIG. 26 with the replaceable anode-cathode component removed to show the anode-cathode recess in an outside wall of a body of the self-recharging battery, in accordance with an embodiment of the present invention.

FIG. 27 is a side perspective view of the self-recharging battery 2600 of FIG. 26 with the replaceable anode-cathode component 2640 removed to show an anode-cathode recess 2710 in an outside wall of the body 2605 of the self-recharging battery 2600, in accordance with an embodiment of the present invention. In FIG. 27, the fluid and electrical connection points are shown and are identical to the connection points in the recess on the opposite side of the body 2605. This enables the replaceable anode-cathode component 2640 to have a single constant design. In FIG. 27, gaskets 2721, 2731 are installed in the spill/fill ports 2720, 2730 to prevent leakage of electrolyte from the body of the self-recharging battery 2600 and the anode and cathode contacts 2740, 2750 are either direct contact or recessed contact to accept spherical connectors as shown on the replaceable anode-cathode component in FIG. 13. In addition, top and bottom indents 2760, 2770 are shown to act as a snap fitting to accept a ball that pushes into a slightly smaller hole made of pliable plastic as shown in FIGS. 10 and 16.

Figure 28:
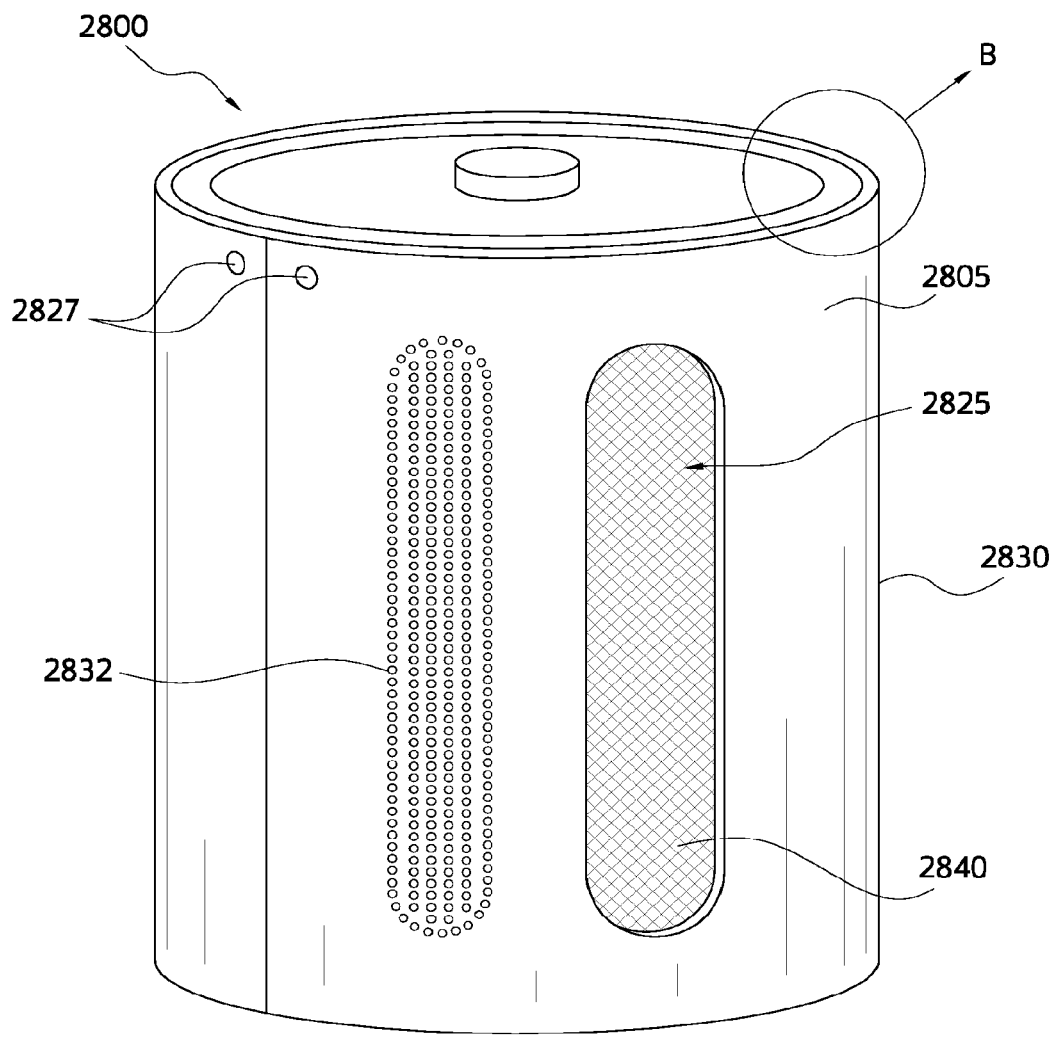
FIG. 28 is a side perspective view of a self-recharging battery with a rotatable sleeve with perforations/air holes positioned around and extending the length of a body of and extending around a top edge and partially onto a top of the self-recharging battery and extending around a bottom edge and partially onto a bottom of the self-recharging battery, in accordance with an embodiment of the present invention.

FIG. 28 is a side perspective view of a self-recharging battery 2800 with a rotatable sleeve 2830 with perforations/air holes 2837 positioned around and extending the length of a body 2805 of and extending around a top edge and partially onto a top of the self-recharging battery 2800 and extending around a bottom edge and partially onto a bottom of the self-recharging battery 2800, in accordance with another embodiment of the present invention. In FIG. 28, there are no ribs or recessed area as in FIGS. 14, 15, 17, and 22-25, instead the rotatable sleeve 2830 completely surrounds the outer wall of the body 2805 of the self-recharging battery 2800 and curves around and onto, but only covers the outer edge of the top and bottom ends. Although perforations/fill holes 2832 are shown in the rotatable sleeve 2830, other embodiments of the sleeve can include the open window of FIG. 25. Vent/fill holes 2827 are seen adjacent the top end of the self-recharging battery 2800.

Figure 29:
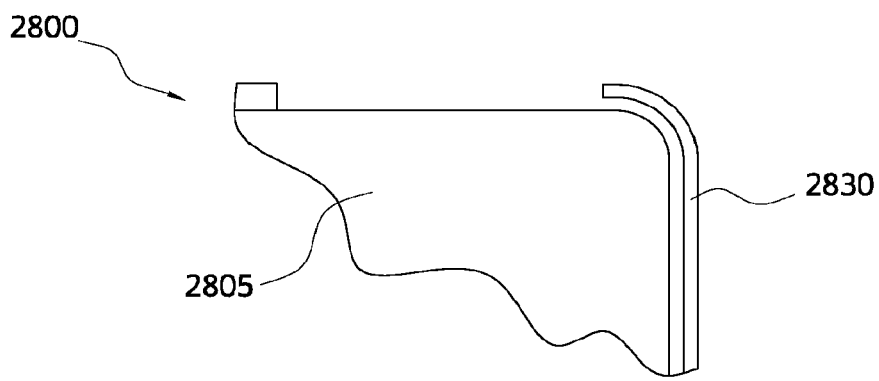
FIG. 29 is a close-up, cross-sectional view of Section B of the self-recharging battery of FIG. 28 showing the rotatable sleeve extending around the top edge and partially onto the top of the self-recharging battery, in accordance with an embodiment of the present invention.

FIG. 29 is a close-up, cross-sectional view of Section B of the self-recharging battery 2800 of FIG. 28 showing the rotatable sleeve 2830 extending around the top edge and partially onto the top of the self-recharging battery 2800, in accordance with an embodiment of the present invention.

Figure 30:
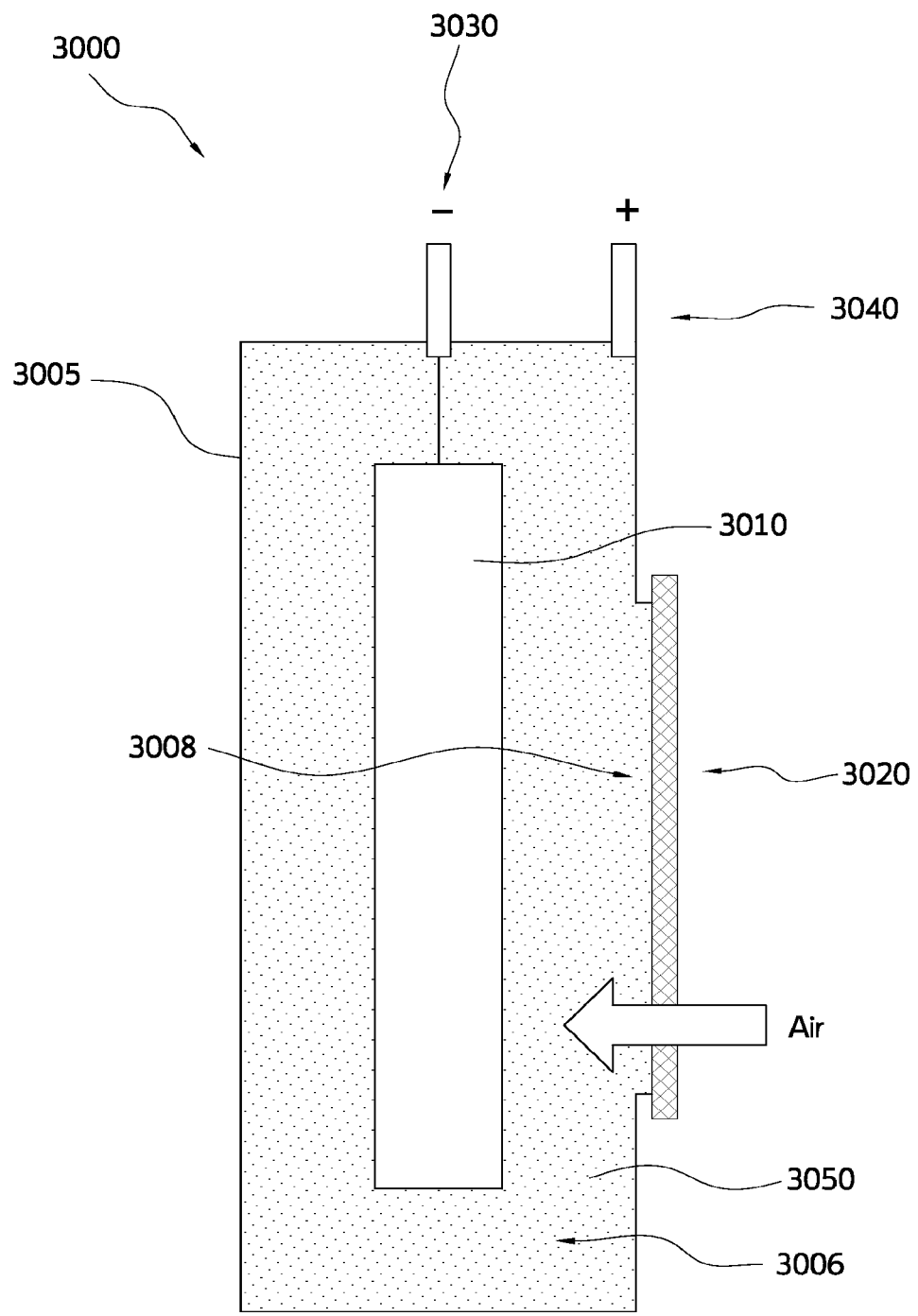
FIG. 30 is a schematic functional diagram for a magnesium-air fuel cell self-recharging battery of FIG. 1, in accordance with an embodiment of the present invention.

FIG. 30 is a schematic functional diagram for a magnesium-air fuel cell as used in the self-recharging battery of FIGS. 1 and 2, in accordance with an embodiment of the present invention. In FIG. 7, the configuration, functioning and electrical connections of the magnesium-air fuel cell created within the annular space of a "C", "D" or other sized battery case are shown. For example, a fuel cell 3000 has an enclosed body 3005 that defines an inner cavity 3006 in which is positioned an anode 3010 that is electrically connected to a negative (−) terminal 3030 and a cathode 3020 that is electrically connected to a positive (+) terminal 3040 and is filled with an electrolyte solution, e.g. a saltwater solution, 3050. The cathode 3020 is positioned over an opening defined in a side wall of the body 3005 and provides a water-tight seal to prevent the loss of the electrolyte 3050 while being air permeable.

In accordance with one or more other embodiments of the present invention, a self-recharging battery may include a substantially sealed body portion with an interior cavity into which an electrolyte may be added to energize the fuel cell, a rechargeable battery sealed within the body portion, the self-recharging battery including at least two replaceable anode/cathode elements that are electrically connected to the self-recharging battery and the rechargeable battery and in fluid communication with the interior cavity of the body portion.

In accordance with an embodiment of the present invention, a self-recharging battery design as substantially shown and described herein.

In accordance with an embodiment of the present invention, a self-recharging battery.

In accordance with an embodiment of the present invention, a non-electric self-recharging battery.

In accordance with an embodiment of the present invention, means for self-recharging.

In accordance with an embodiment of the present invention, self-recharging battery means.

In accordance with an embodiment of the present invention, a saltwater-powered, self-recharging battery.

In accordance with an embodiment of the present invention, a saltwater-powered, self-recharging battery including a saltwater-powered fuel cell, and a rechargeable battery contained within and electrically connected to the fuel cell.

In accordance with an embodiment of the present invention, a saltwater-powered, self-recharging battery including a saltwater-powered fuel cell having at least two replaceable anode-cathode pair components, and a rechargeable battery contained within and electrically connected to the fuel cell for recharging.

In accordance with an embodiment of the present invention, a self-recharging battery including a rechargeable battery; a water-tight battery enclosure sealingly enclosing the rechargeable battery; a body portion surrounding and enclosing the rechargeable battery and the body portion including a substantially cylindrical body portion, a positive end with a positive conductive portion and a negative end with a negative conductive portion, and the inside of the body portion defining a water-tight inner volume to contain an electrolyte liquid; and at least two anode-cathode pairs connected in series to each other with a cathode in a first anode-cathode pair connected to the positive end of the body portion and a positive end of the rechargeable battery, an anode in the first anode-cathode pair connected to a cathode in a second anode-cathode pair and an anode in the second anode-cathode pair connected to the negative end of the body portion and a negative end of the rechargeable battery.

In accordance with an embodiment of the present invention, a self-recharging battery including a rechargeable battery; a water-tight battery enclosure sealingly enclosing the rechargeable battery; a body portion surrounding and enclosing the rechargeable battery and the body portion including a substantially cylindrical body portion, a positive end with a positive conductive portion and a negative end with a negative conductive portion, and the inside of the body portion defining a water-tight inner volume to contain an electrolyte liquid; and at least two replaceable anode-cathode pair components connected in series to each other with a cathode in a first replaceable anode-cathode pair component connected to the positive end of the body portion and a positive end of the rechargeable battery, an anode in the first replaceable anode-cathode pair component connected to a cathode in a second replaceable anode-cathode pair component and an anode in the second replaceable anode-cathode pair component connected to the negative end of the body portion and a negative end of the rechargeable battery.

In accordance with an embodiment of the present invention, a self-recharging battery including a magnesium-air fuel cell component having external battery connector elements; a rechargeable battery; a water-tight inner sleeve configured to and receiving the rechargeable battery and the inner sleeve being fixedly connected to an inner side of the magnesium-air fuel cell component and the rechargeable battery being electrically connected to the magnesium-air fuel cell component external battery connector elements.

In accordance with an embodiment of the present invention, a body portion; a rechargeable battery; an inner sleeve configured to and receiving the rechargeable battery and opposite edges of the inner sleeve being fixedly connected to opposite inner sides of the body portion; a pair of opposite openings defined in the body; a pair of cathodes with each one of the cathodes sealingly covering a portion of the inner side surrounding a respective one of the pair of opposite openings; a first anode electrically connected to a top side of a bottom metal disk in a base portion of the body portion, and a bottom side of the bottom metal disk being electrically connected to the top side of the bottom metal disk; a second anode electrically connected to a first one of the pair of cathodes; a top of the rechargeable battery being electrically connected to a second one of the pair of cathodes and both being electrically connected to a bottom side of a top metal disk in a top portion of the body portion, and a top side of the top metal disk being electrically connected to the bottom side of the top metal disk; at least one fill hole defined in a side of the body adjacent a top of the body portion; and an electrolyte at least partially filling an inside of the body portion and being in contact with the pair of cathodes and the first and second anodes.

In accordance with an embodiment of the present invention, a method for enabling a self-recharging battery including filling a saltwater-powered fuel cell in the battery with an electrolyte, exposing a part of at least one cathode in the saltwater-powered fuel cell to air, and covering the part of the at least one cathode to prevent further exposure to the air after a predetermined amount of time.

The invention having been described in certain embodiments, it will be apparent to those skilled in the art that many changes and alterations can be made without departing from the spirit or essential characteristics of the invention. Accordingly, Applicants intends to embrace all such alternatives, modifications, equivalents and variations that are within the spirit and scope of this invention.

What is claimed is:

1. A self-recharging battery apparatus, comprising:
   a body portion;
   a rechargeable battery;
   an inner sleeve configured to receive the rechargeable battery and opposite edges of the inner sleeve being fixedly connected to opposite inner sides of the body portion;
   a pair of opposite openings defined in the body;
   a pair of cathodes with each one of the cathodes sealingly covering a portion of the inner sides of the body portion surrounding a respective one of the pair of opposite openings;
   a first anode electrically connected to a top side of a bottom metal disk in a base portion of the body portion, and a bottom side of the bottom metal disk being electrically connected to the top side of the bottom metal disk;
   a second anode electrically connected to a first one of the pair of cathodes;
   a top of the rechargeable battery being electrically connected to a second one of the pair of cathodes and both being electrically connected to a bottom side of a top metal disk in a top portion of the body portion, and a top side of the top metal disk being electrically connected to the bottom side of the top metal disk;
   at least one fill hole defined in a side of the body adjacent a top of the body portion; and
   an electrolyte at least partially filling an inside of the body portion and being in contact with the pair of cathodes and the first and second anodes.

2. The self-recharging battery apparatus of claim 1 wherein the body portion comprises two separate halves.

3. The self-recharging battery apparatus of claim 2 wherein the opposite edges of the inner sleeve are fixedly connected between the two separate body portion halves.

4. The self-recharging battery apparatus of claim 3 wherein the inner sleeve comprises acetate and forms a watertight seal around the rechargeable battery.

5. The self-recharging battery apparatus of claim 4 wherein the pair of openings are generally disposed longitudinally along a length and on substantially opposite sides of the body.

6. The self-recharging battery apparatus of claim 5 wherein each cathode comprises a carbon fiber fabric with a wire mesh backing.

7. The self-recharging battery apparatus of claim 6 wherein the carbon fiber fabric with a wire mesh backing prevents the escape of the electrolyte.

8. The self-recharging battery apparatus of claim 7 wherein the first anode is electrically connected to the bottom metal disk by a rigid "L"-shaped piece of metal and positioned against a first side of the sleeve and substantially opposite of a first one of the pair of cathodes.

9. The self-recharging battery apparatus of claim 8 wherein the second anode is positioned against an opposite second side of the sleeve and substantially opposite of a second one of the pair of cathodes.

10. The self-recharging battery apparatus of claim 9 wherein the at least one fill hole comprises two pairs of fill holes defined in opposite sides of the body.

11. The self-recharging battery apparatus of claim 9 wherein an area surrounding an inside opening of each of the fill holes is covered by a self-sealing rubber dam.

12. The self-recharging battery apparatus of claim 11 wherein the second anode is electrically connected to the first cathode and the second cathode is electrically connected to the top of the rechargeable battery and the bottom side of the top metal disk by separate insulated brass bus bars.

13. The self-recharging battery apparatus of claim 12 wherein the electrolyte comprises an about 7% salt water solution.

14. The self-recharging battery apparatus of claim 13 further comprising a cylindrical plastic sleeve defining window openings on opposite sides of the cylindrical plastic sleeve and the cylindrical plastic sleeve rotatably positioned around the body portion of the self-recharging battery apparatus.

15. A self-recharging battery apparatus, comprising:
a magnesium-air fuel cell component having external battery connector elements;
a rechargeable battery; and
a water-tight inner sleeve configured to receive the rechargeable battery and the inner sleeve being fixedly connected to an inner side of the magnesium-air fuel cell component and the rechargeable battery being electrically connected to the magnesium-air fuel cell component external battery connector elements.

16. A self-recharging battery apparatus, comprising:
a rechargeable battery;
a water-tight battery enclosure sealingly enclosing the rechargeable battery;
a body portion surrounding and enclosing the rechargeable battery and the body portion including a substantially cylindrical body portion, a positive end with a positive conductive portion and a negative end with a negative conductive portion, and the inside of the body portion defining a water-tight inner volume to contain an electrolyte liquid; and
at least two replaceable anode-cathode pair components connected in series to each other with a cathode in a first replaceable anode-cathode pair component connected to the positive end of the body portion and a positive end of the rechargeable battery, an anode in the first replaceable anode-cathode pair component connected to a cathode in a second replaceable anode-cathode pair component and an anode in the second replaceable anode-cathode pair component connected to the negative end of the body portion and a negative end of the rechargeable battery.

* * * * *